United States Patent [19]
Arata

[11] Patent Number: 5,647,970
[45] Date of Patent: Jul. 15, 1997

[54] METHOD OF PRODUCING ULTRAHIGH PRESSURE GAS

[76] Inventor: Yoshiaki Arata, 247, Aza Shonomoto, Gunge, Mikage-cho, Higashinada-ku, Kobe-shi, Hyogo, Japan

[21] Appl. No.: 578,933

[22] Filed: Dec. 27, 1995

[30] Foreign Application Priority Data

Dec. 27, 1994 [JP] Japan .................. 6-324459

[51] Int. Cl.⁶ .......................... B01D 53/00; B01D 53/32
[52] U.S. Cl. .............................. 205/763; 205/765
[58] Field of Search .................... 205/763, 764, 205/765

[56] References Cited

U.S. PATENT DOCUMENTS

| | | | |
|---|---|---|---|
| 3,188,283 | 6/1965 | Cole | 205/763 |
| 5,118,261 | 6/1992 | Yamauchi et al. | 205/765 |
| 5,118,395 | 6/1992 | Chen et al. | 205/765 |
| 5,137,607 | 8/1992 | Anderson et al. | 205/763 |

*Primary Examiner*—Arun S. Phasge
*Attorney, Agent, or Firm*—Wenderoth, Lind & Ponack

[57] ABSTRACT

A method of producing ultrahigh pressure gas statically and stably without using a dynamic driving unit such as a pump. A container formed with a closed space is made of a palladium, which is a metal having a high permeability to hydrogen and deuterium. A solution present around the container is electrolyzed by producing an electric field between the container which serves as a cathode and an anode. The gas element produced by electrolysis penetrates into the container body, so that the hydrogen/deuterium ion concentration in the container increases. This solid-air equilibrium reaction is carried out until the ion concentration increases to a level at which the pressure in the closed space reaches a predetermined ultrahigh level. Thus, an ultrahigh pressure gas is produced in the closed space of the container.

3 Claims, 6 Drawing Sheets

METHOD OF PRODUCING ULTRAHIGH PRESSURE GAS

BACKGROUND OF THE INVENTION

This invention relates to a method of producing an ultrahigh pressure gas, i.e. a method of increasing the pressure of an active gas such as hydrogen or oxygen by generating electric energy between electrodes to an ultrahigh level.

As is well known, a liquid pressure or a gas pressure is produced e.g. by compressing a liquid or a gas with a compression pump. An ultrahigh pressure is produced by e.g. compressing a liquid such as water or oil or an element gas by feeding the liquid or gas continuously into a solid container with a compression pump. Ordinary compression pumps have a rotary vane or rotor, but other known compression pumps have a reciprocating piston.

As is well-known, an entire system for producing an ultrahigh pressure using a compression pump is very large in size, irrespective of the type of the compression pump used. Another problem in systems using active gas such as oxygen and hydrogen is the potential danger of explosion resulting from e.g. a shock from a driving unit or leakage of pipes. Thus, it is necessary to provide devices with some explosion preventive means.

An object of the present invention is to provide a simple method for producing an ultrahigh gas pressure which can produce an ultrahigh pressure stably using a compact device.

SUMMARY OF THE INVENTION

According to the present invention, there is provided a method of producing an ultrahigh pressure gas including the steps of putting a solution or a gas around a container body made of a gas permeable material and having a closed space therein, producing an electric field through the container body between a pair of electrodes to cause a solid-gas equilibrium reaction for absorbing and dissolving a gas element contained in the solution or the gas into the container body by use of electric energy produced between the electrodes, and maintaining the reaction to increase the concentration of the gas element dissolved in the container body until the pressure of the gas that has penetrated through the container body into the closed space increases to a predetermined ultrahigh level.

In a first embodiment, there is disclosed a method of producing an ultrahigh pressure gas which employs a the container made of palladium and used as a cathode. An anode is provided opposite to the container body to produce an electric field through the container body. Also, a gas element, contained in a solution present outside the container, is absorbed and dissolved into the container body with electrolyzing the solution by electric energy produced between the cathode and the anode.

In accordance with a second embodiment, there is disclosed a method of producing an ultrahigh gas pressure which employs a container made of a positive or negative ion conductive solid. Porous electrodes are provided on inner and outer surfaces of the container to produce an electric field through the container body. Also, a gas element, contained in a solution or a gas present outside the container, is absorbed and dissolved into the container body utilizing electric energy produced between the electrodes.

By the method according to the present invention, it is possible to statically produce a desired ultrahigh pressure by applying an electric field energy to a solid container body, based on a solid-gas equilibrium reaction without using any conventional power device such as a compression pump.

The solid container is made of a gas permeable solid material. By applying an electric field energy to the solid container, an active element such as hydrogen or oxygen, contained in a solution or in a gas provided outside the container, penetrates through and into the container in the form of protons or oxygen ions, and thus stored therein in the form of gas.

With the migration of hydrogen or oxygen into the container, the gas pressure P in the solid container increases until an equilibrium is achieved between the concentration of hydrogen or oxygen that has penetrated into the container body and the pressure in the solid container. If hydrogen is used, this relation is described by the formula:

$$H^* = a + b \log P_{H2} \quad (1)$$

a simplified form of which is:

$$[H] = k\sqrt{P_{H2}} \quad (2)$$

where H is the concentration ratio between solid M and hydrogen $H \cdot X = [H/M]$, and a, b and k are constants which are functions of temperature.

If the solid M is iron, the above formula represents the famous Sieverts' law (about 1935). The above value at one atm has been actually measured for each temperature. This formula is essential in the smelting and welding art.

This formula is used e.g. to explain hydrogen cracks in a welding portion such as shown in FIG. 5A. Now suppose a small hole is present in the welding portion of iron. FIG. 5B shows that the pressure $P_{H2}$ in this small hole can increase to an ultrahigh level.

Suppose, for example, the welding portion is heated to 1500° C. by arc welding at one atm until saturated concentration of hydrogen is reached, and then cooled quickly to 0° C. (quenching), the pressure $P_{H2}$ in the small hole could theoretically reach as high as a tenth of a billion atm. In the figure, $k_0$ and $k_{100}$ represent proportional constants when the temperature of the welding portion has been instantly changed to 0° C. and 100° C. respectively.

This formula represents the relation when the pressure in the small hole in the welding portion balances with the concentration [H]% of hydrogen contained in the iron. If the temperature of the welding portion is cooled slowly from 1500° C. to 0° C. taking a sufficiently long time, hydrogen in the iron would be dispersed into the atmosphere so that the [H]% concentration will drop to $2.86 \times 10^{-8}$[H]%, which corresponds to $\sqrt{P_2}$=one atm. $P_{H2}$ in the small hole will thus be one atm.

But if the temperature of the welding portion is reduced quickly from 1500° C. where the balanced state of hydrogen is reached, to 0° C. the gas concentration [H] will remain at $6.78 \times 10^{-4}$ (at equilibrium at d1500° C.) whereas the temperature drops. Thus, by the time the temperature drops to 0° C., the gas pressure will increase to an ultrahigh level of a tenth of a billion atm. The iron welding portion, unable to withstand such a high pressure, will suffer cracks.

It will be understood from the above that it is possible to produce an ultrahigh pressure not only in the abovementioned small hole but also in any small closed space. In the above-described case, the temperature is reduced quickly to dramatically reduce the gas dissolving concentration and thus to increase the pressure to an ultrahigh level. In the present invention, the same purpose is achieved by producing an electric field instead of reducing the temperature.

In the above-described example, the member corresponding to the solid container is made of iron. But the container of the present invention is preferably made of palladium (Pd) because of its high permeability to hydrogen or deuterium. FIG. 6 shows a relationship between the pressure $P_{H2}$[atm] of hydrogen gas $H_2$ in the closed space formed in a solid container made of Pd and the hydrogen concentration $H \cdot X$ (=[H/Pd]; $H \cdot X = a + b \log P_{H2}$) that balances with the pressure $Ps_{H2}$.

As shown, at $H \cdot X = 0.9$ ([H] is 90%), $P_{H2}$ is 20000 atm (point 0 in the figure, 0° C.), and at $H \cdot X = 1$, $P_{H2}$ is about a million atm. If deuterium is used, a pressure is needed which is about 10 to 100 times higher than when using hydrogen. Namely, the pressure will be $10^7 - 10^8$ at $D \cdot X = 1$ ($D \cdot X = [D/Pd]$, D: deuterium). Thus, theoretically, if the ion concentration of the solid container is sufficiently near 100%, the gas pressure in the solid container will be astronomical.

The gas pressure in the solid container can be increased to several tens of thousands of atm by continuously applying electric energy, provided the solid container can withstand such a high pressure. In other words, the ultrahigh pressure attainable in the container is practically determined by the pressure resistance of the solid container.

According to the material of which the solid container is formed, element gases are absorbed into the container body in a slightly different manner.

For example, in the case in which the solid container is formed of palladium (Pd), a material known to have high permeability to hydrogen H and deuterium, Pd itself is used as a cathode and a current is passed between this cathode and an anode such as a platinum electrode to take hydrogen or deuterium into the Pd container by electrolyzing an aqueous solution or a deuterium solution.

In another embodiment, the solid container is made of a positive or negative ion-conductive material. In this case, due to low conductivity of the non-metallic container body, an electric field is produced by means of porous electrodes mounted on the inner and outer surfaces of the container body. By supplying electricity between the electrodes, a gas element in the solution or gas is absorbed and dissolved into the ion-conductive container body under the action of the electric energy. This arrangement is especially suited for the production of ultrahigh-pressure gas using positive ions such as protons or deutron, or such negative ions as oxygen $O^-$ ions.

Other features and objects of the present invention will become apparent from the following description made with reference to the accompanying drawings, in which:

DETAILED DESCRIPTION OF THE PREFERRED EMBODIMENT

Embodiments are now described with reference to the drawings.

Figure 1A:
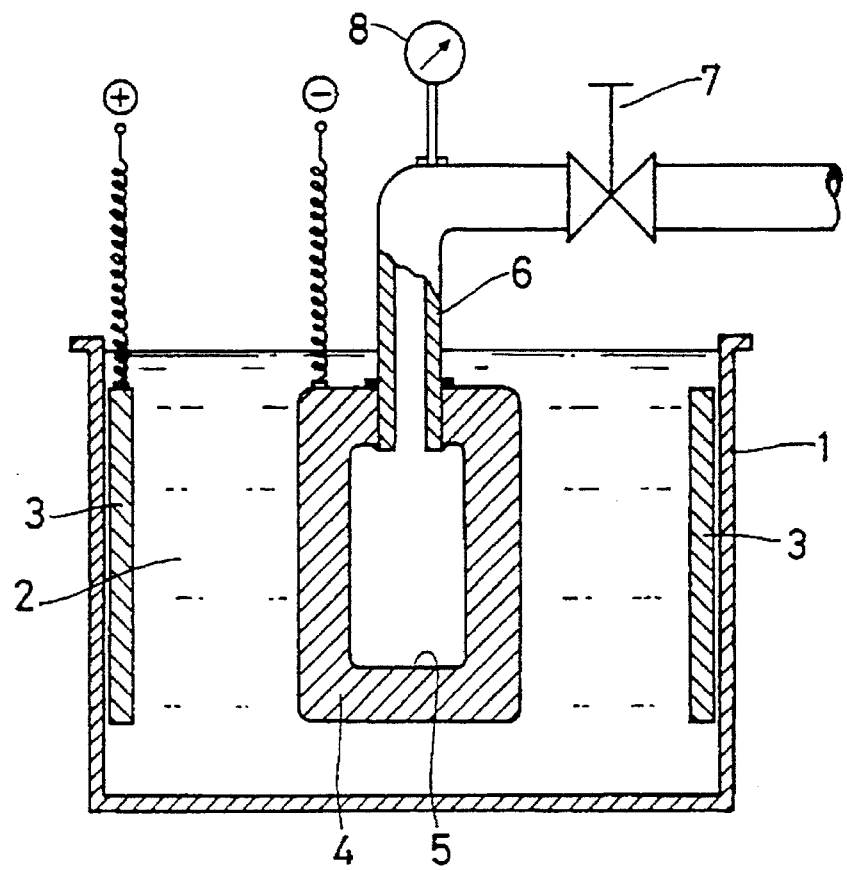
FIG. 1A is a view of a first embodiment of the present invention showing a device for producing an ultra-high pressure.

FIG. 1A schematically shows a first embodiment of a device for producing an ultrahigh pressure gas.

The device includes an electrolytic cell 1 filled with an aqueous solution 2 containing an electrolyte. The cell 1 houses a cylindrical platinum electrode 3 as an anode and a metallic container 4 made of palladium (Pd) and located inside the platinum electrode 3. The metallic container 4 has a closed or sealed space 5. A pipe 6 is inserted in the space 5 to take out pressure which has been produced in the container 4. The pipe 6 is opened and closed by an on-off valve 7. A pressure gauge 8 is connected to the pipe 6.

Figure 1B:
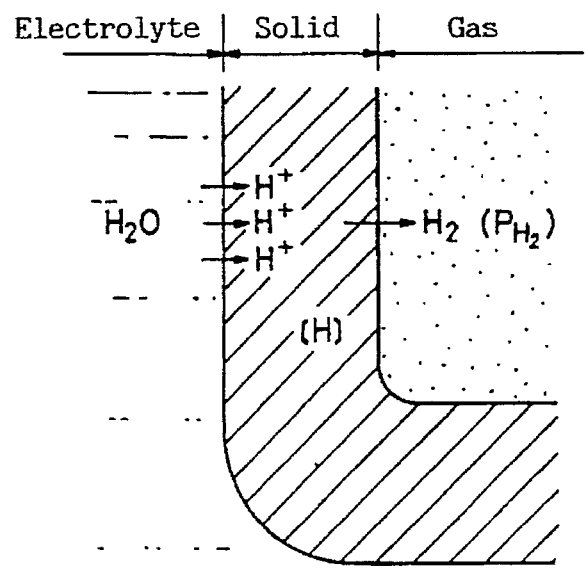
FIG. 1B is a view explaining the principle.

An electric field is produced between the platinum electrode 3 as the anode and the metallic container 4 as the cathode. The electric field produces a large amount of hydrogen ions $H^+$ by electrolyzing the aqueous solution. The hydrogen ions $H^+$ thus produced are absorbed into the wall of the metallic container 4 as shown schematically in FIG. 1B.

Figure 2:
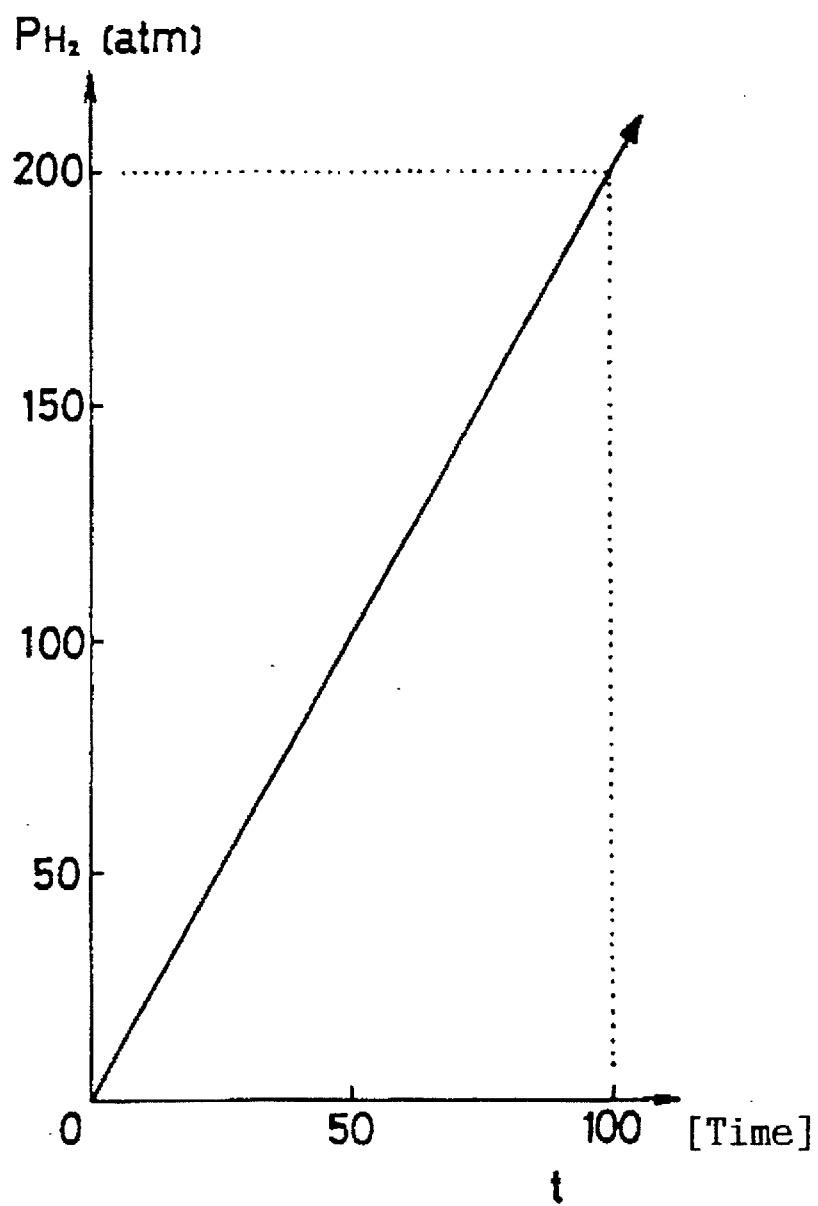
FIG. 2 is a graph showing the relationship between the inner pressure and time.

FIG. 2 shows the pressure $P_{H2}$ in [atm] produced in a metallic container made of palladium and having a 2 cm ø outer diameter ×5 cm and a 1.5 cm ø inner diameter ×4 cm when an electrolytic current of 10 Amp is passed. As shown, at 100 hours, a pressure of about 200 [atm] was produced. In 500 hours, an ultrahigh pressure of about 1000 [atm] will be produced.

Figure 3:
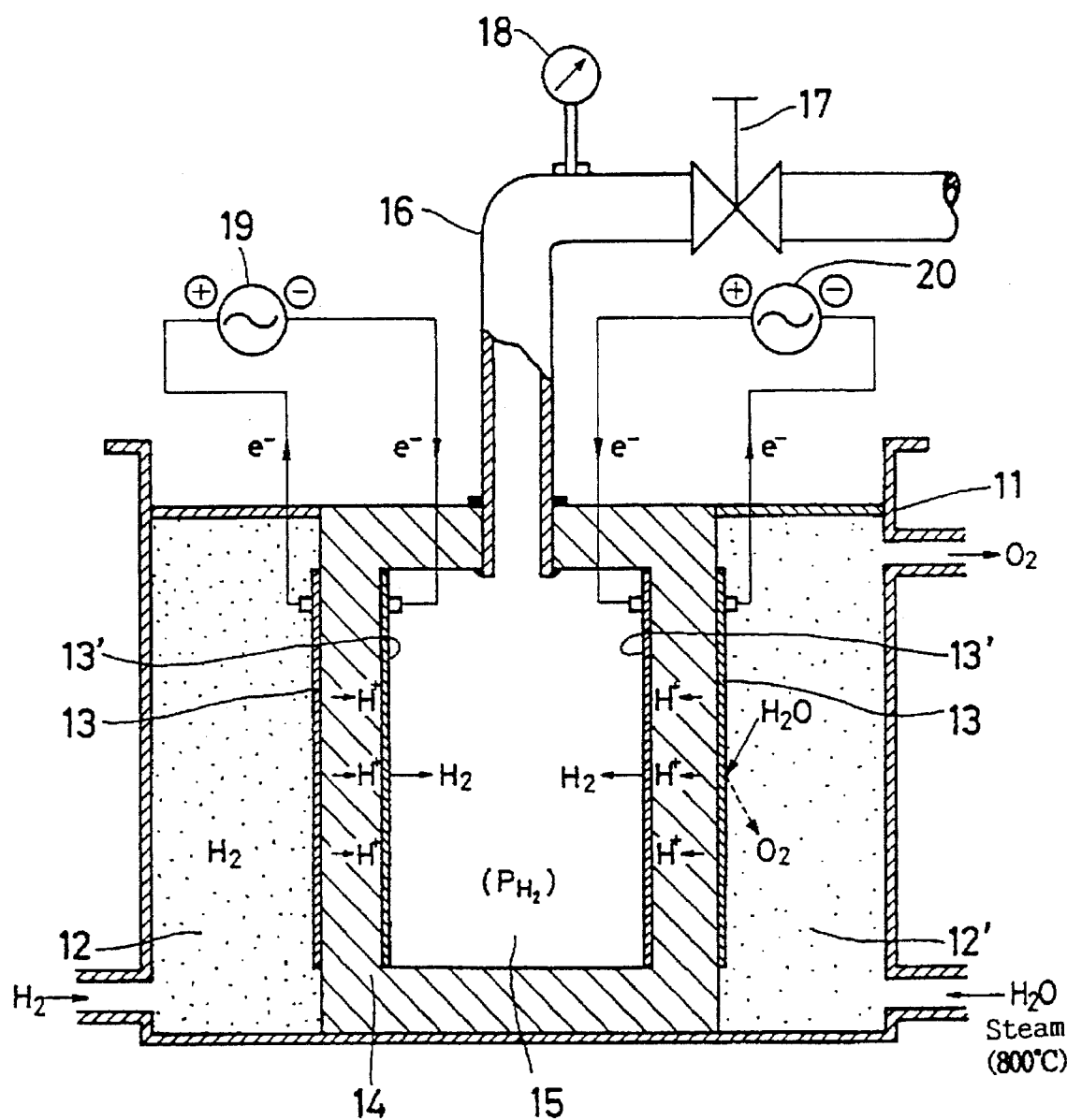
FIG. 3 is a view of a second embodiment of the present invention showing a device for producing ultra-high pressure.
Figure 4:
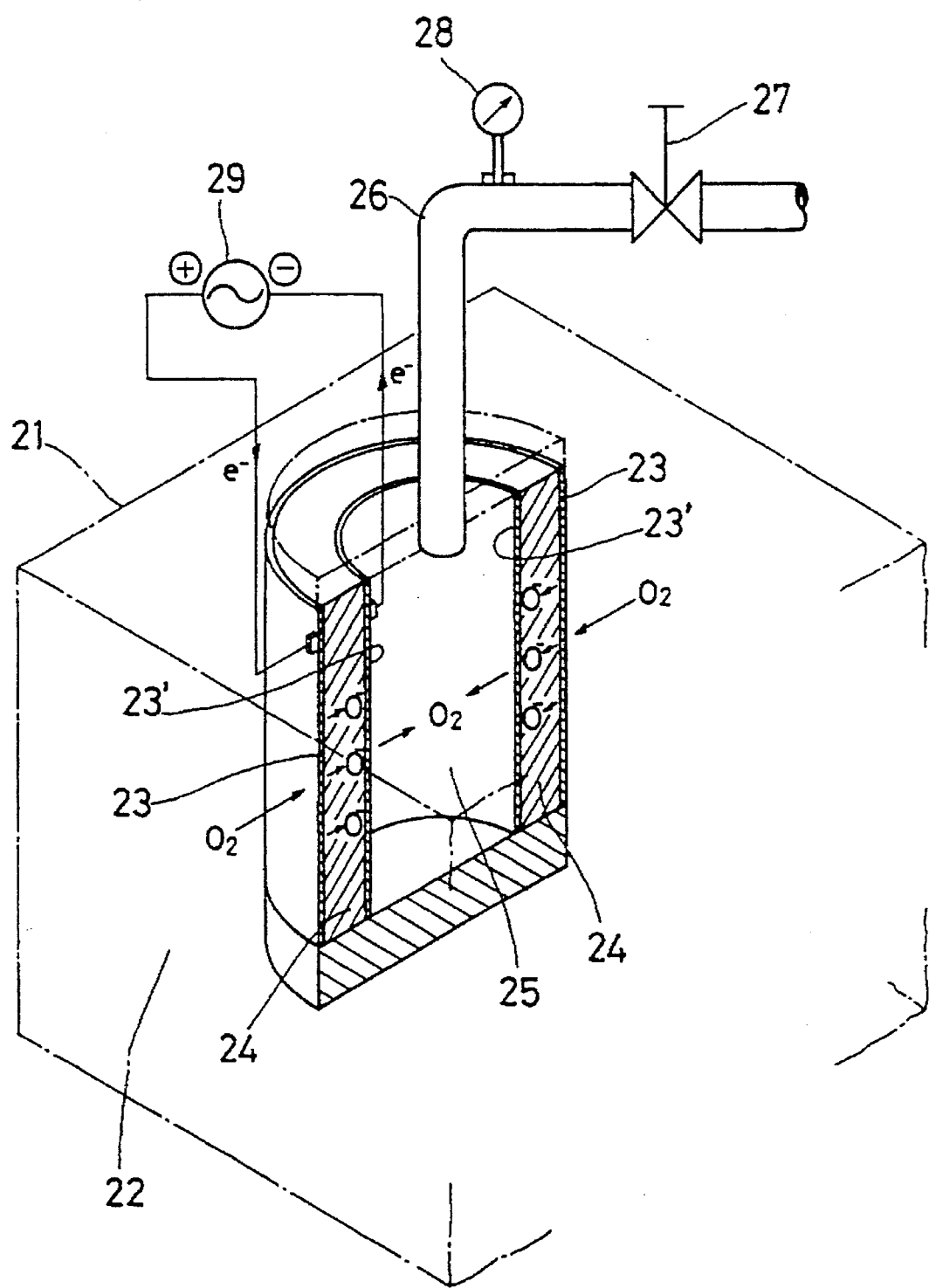
FIG. 4 is a view of a third embodiment of the present invention showing a device for producing ultrahigh pressure.
Figure 5A:
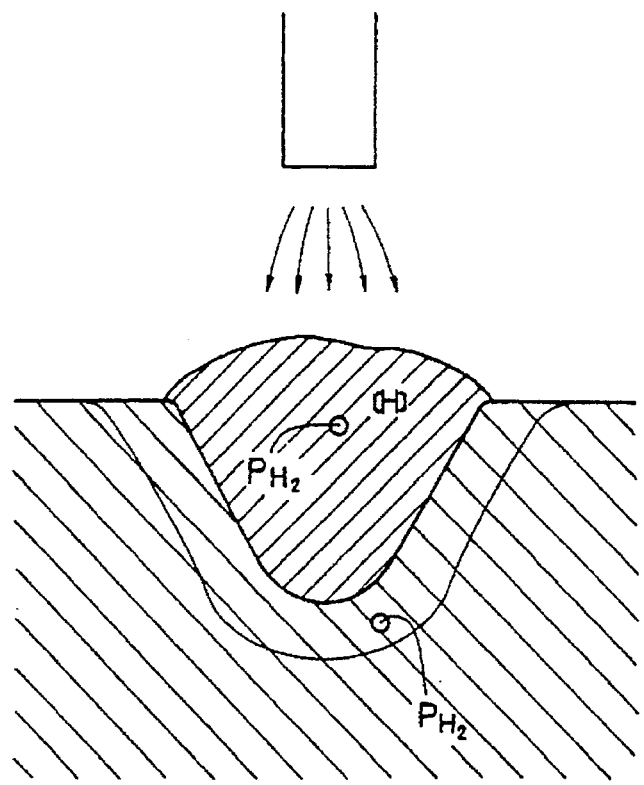
FIG. 5A is a view illustrating the mechanics of hydrogen cracks in a welded portion.
Figure 5B:
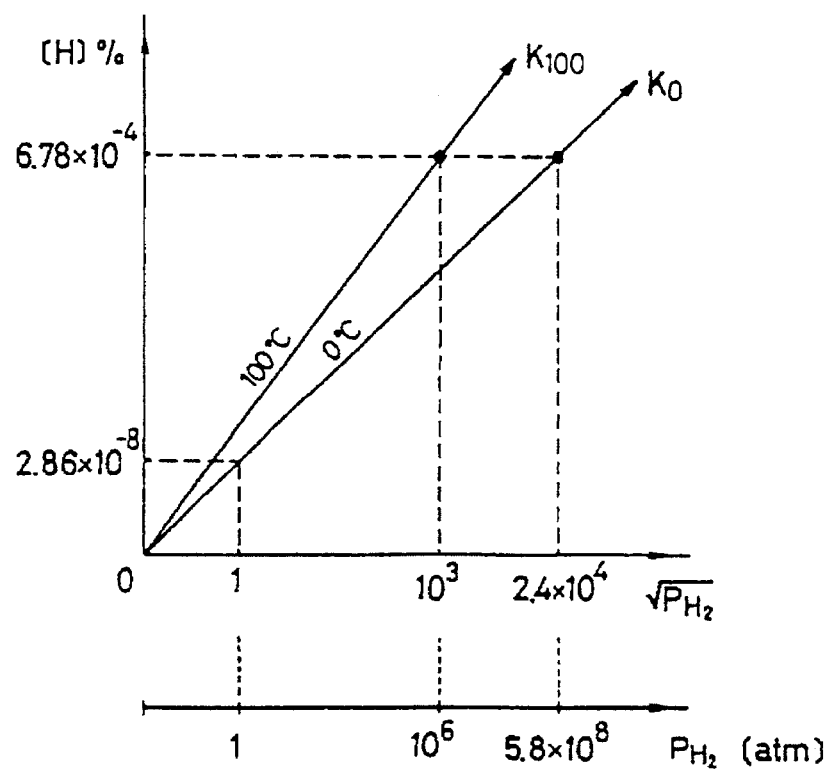
FIG. 5B is a graph showing actual measured data obtained based on the Sieverts' relation.
Figure 6:
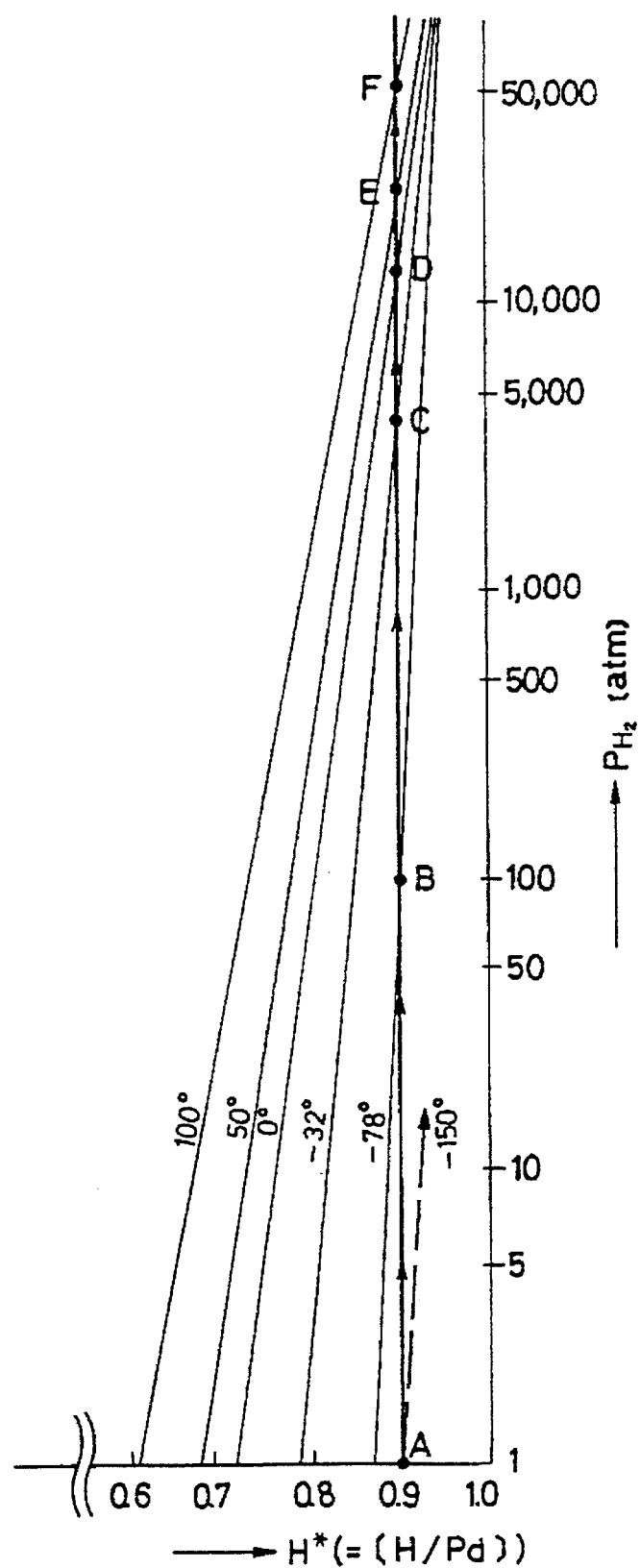
FIG. 6 is a graph showing the relationship between the pressure $P_{H2}$ of hydrogen gas $H_2$ and the hydrogen concentration H in Pd that balances with the pressure $P_{H2}$

FIGS. 3 and 4 show devices according to the second and third embodiments of the present invention. In the second embodiment shown in FIG. 3, a solid container 14 made of a proton conductive solid is used to produce an ultrahigh pressure in a closed space 15. Gases are taken into a cell 11. Namely, hydrogen ($H_2$) gas 12 is introduced into the lefthand side space of the cell 11, while high-temperature (800° C.) water vapor ($H_2O$) 12' is injected into the righthand side space. The right and left spaces are partitioned by the container 14 so that they do not communicate with each other.

Porous electrodes 13' and 13 are mounted on the inner and outer surfaces of the side wall of the container 14 at the container's right and left sides. The top wall, bottom wall, and side walls of the container 14 are closed by plates of the same material having the same pressure resistance. A pipe 16 is connected to the top wall of the container 14 so as to communicate with the closed space 15. An on-off valve 17 is connected to an end of the pipe 16. A pressure gauge 18 is connected to an intermediate point of the pipe 16. Numerals 19 and 20 indicate DC current sources.

The proton conductive solid is a solid solution including a perovskite type oxide (ceramic) such as $SrCeO_3$ or $BaCeO_3$ with part of Ce replaced by a rare earth element such as Sc, Y, Yb, Nd or Gd, namely a solid solution expressed by such formulas as $SrCe_{1-x}N_xO_{3-y}$ and $BaCe_{1-x}N_xO_{3-y}$ (where y is the number of missing oxygen atoms per unit formula).

By applying a direct current through the porous electrodes in this embodiment, $H_2$ molecules contained in the $H_2$ gas 12 in the lefthand side space are absorbed into the container 14 in the form of protons $H^+$, whereas water vapor 12' in the righthand space is electrolyzed, so that $H_2$ molecules produced are absorbed into the container. As a result, a large amount of protons $H^+$ flowing through the wall of the container 14 are introduced under pressure into the closed space 15 in the form of $H_2$ gas. The pressure in the closed space thus increases to an ultrahigh level.

In an experiment where a direct current of 100 [mA/cm$^2$] was applied, using $SrCe_{0.95}Yb_{0.05}O_{3-y}$ as the solid M, the volume of $H_2$ molecules permeated at 800° C. was 0.7 [ml/min.cm$^2$]. If this operation is carried out for one full day with the electrode area of the solid M of 100 cm$^2$, a large amount of $H_2$ gas of about 100 liters will be introduced into the closed space 15. Thus, it is possible to produce an ultrahigh pressure as high as the pressure produced in the first embodiment.

In this embodiment, protons $H^+$ are absorbed in different ways into the right and left side walls of the container. Namely, hydrogen molecules $H_2$ are absorbed through one of the side walls, while $H_2$ molecules produced by electrolyzing water vapor $H_2O$ are absorbed through the other side wall. However, protons $H^+$ may be absorbed in one of the above two ways through both side walls. The cell 11, container 14 and electrodes 13, 13' may be all cylindrical members.

In the embodiment of FIG. 4, the solid container is made of an oxide type ion conductor such as stabilized zirconia or a $BaCeO_3$ ceramic. In the particular example shown, the solid container 24 is formed from a $BaCeO_3$ ceramic into a cylindrical shape. Otherwise, this embodiment is essentially the same as the other embodiments. The entire device is shown schematically. Like elements are denoted by similar but 20-something numbers.

Functionally, this embodiment is the same as the embodiment in which hydrogen H+ ions are used. $O^-$ ions move along the electric field, producing an ultrahigh pressure by $O_2$ gas in the closed space 25 in the container 24.

According to this invention, unlike the conventional arrangement in which an ultrahigh pressure gas is produced using a driving unit such as a pump, there will be no danger of explosion because an ultrahigh pressure gas is produced statically and stably in a closed space formed in a solid sealed container within the maximum pressure resistance of the container.

The ultrahigh pressure gas thus produced can be used for the operation of various industrial machines that require such ultrahigh pressure e.g., for a cold nuclear fusion reactor of the type that produces a nuclear fusion reaction by compressing hydrogen or deuterium to an ultrahigh pressure, or to produce ceramic materials by applying a hot hydrostatic pressure using a hot hydrostatic pressure sintering technique (HIP in which a material is sintered in an inert gas sealed in a high-pressure container and compressed to 1000–2000 atm).

According to the present invention, it is possible to produce ultrahigh pressure gas of different gases using containers made of different materials. The gas elements depend on the containers used. In other words, it is possible to select either of the arrangements that is more efficient than the other depending upon actual use conditions.

What is claimed is:

1. A method of producing a high pressure gas, the method comprising:

surrounding a container with a solution or a gas, said container having walls defining an inner space, wherein said walls are made of a solid material which is permeable to gas elements;

sealing said container so that gas pressure can accumulate in said inner space of said container;

producing an electric field through said container between a pair of electrodes so as to create a solid-gas equilibrium reaction to absorb and dissolve a gas element, contained in said solution or said gas, through said walls and into said sealed inner space by use of electrical energy produced between said electrodes; and maintaining said reaction so as to increase the concentration of the gas element dissolved in said walls of said container until the pressure of the gas that has penetrated through said container walls into said sealed inner space increases to a level not greater than the pressure resistance of said container.

2. The method of producing a high pressure gas as claimed in claim 1, wherein:

said solid container material is palladium and is used as a cathode;

said electric field is produced through said container body by providing an anode opposite to said container; and said electric field produces said electrical energy between said cathode and said anode such that said solution is electrolyzed and a gas element, contained in said solution present outside of said container walls, is absorbed and dissolved into said container walls.

3. The method of producing a high pressure gas as claimed in claim 1, wherein:

said solid container material is a positive or negative ion conductive solid; and said electrical energy is produced by providing porous electrodes on inner and outer surfaces of said container walls, and a gas element, contained in said solution or said gas present outside of said container walls, is absorbed and dissolved into said container walls by said electrical energy.

\* \* \* \* \*